United States Patent [19]

Fordyce

[11] 3,743,257

[45] July 3, 1973

[54] CIRCULAR MECHANICAL DRAFT COOLING TOWER

[76] Inventor: Homer E. Fordyce, 811 East 83rd St. North, Kansas City, Mo. 64118

[22] Filed: Feb. 17, 1972

[21] Appl. No.: 227,097

Related U.S. Application Data

[63] Continuation-in-part of Ser. No. 115,012, Feb. 12, 1971, abandoned.

[52] U.S. Cl. .......................... 261/112, 261/DIG. 11
[51] Int. Cl. ............................................... B01f 3/04
[58] Field of Search ..................... 261/112, DIG. 11

[56] References Cited
UNITED STATES PATENTS

| | | | |
|---|---|---|---|
| 3,243,166 | 3/1966 | Osenga et al. | 261/DIG. 11 |
| 3,333,835 | 8/1967 | De Flon | 261/111 |
| 3,411,758 | 11/1968 | Edmondson | 261/DIG. 11 |

Primary Examiner—Tim R. Miles
Assistant Examiner—Steven H. Markowitz
Attorney—Schmidt, Johnson, Hovey & Williams

[57] ABSTRACT

A multi-fan, crossflow water cooling tower of circular configuration wherein an annular fill assembly having an open outer air inlet face around the entire perimeter thereof, is positioned beneath an annular hot water distributor and above an annular cold water collection basin. The fan structure comprises a relatively large number of horizontal fans arranged in a cluster pattern inboard of the hot water distributor and each rotatable within a respective upright air velocity recovery cylinder. The clustered fans pull ambient air into the fill assembly through the inlet face, move the air horizontally through the fill assembly in crossflow relationship to water gravitating downwardly therein, and then discharge the air vertically from the cylinders in the form of a high-rising discharge column of hot moist air which resists deflection by ambient air currents. The cylinders extend above the hot water distributor into the path of ambient currents but are of relatively low height. The circular tower configuration employing a large number of fans located in a cluster pattern minimizes recirculation of hot air back to the tower regardless of the direction from which the wind is blowing or the velocity thereof.

30 Claims, 11 Drawing Figures

Patented July 3, 1973  3,743,257

CIRCULAR MECHANICAL DRAFT COOLING TOWER

CROSS-REFERENCE

This is a continuation-in-part of copending application Ser. No. 115,012 filed Feb. 12, 1971 and now abandoned.

This invention relates to water cooling towers and particularly a circular mechanical draft cooling tower which retains its operating characteristics regardless of the direction of the wind, with minimum hot air recirculation notwithstanding the fact that the use of high fan stacks or a natural draft stack is avoided in the design to maintain the cost of the tower at a minimum.

Natural draft water cooling towers have long been in use in this and foreign countries to induce air from the ambient atmosphere to flow through a fill assembly where the cool air is brought into thermal interchange relationship with hot water gravitating downwardly in the fill. Although natural draft towers having a relatively high stack for adequate chimney effect are efficient and do not require power for operating fans, the initial cost of a natural draft water cooling tower is relatively high. High stack natural draft cooling towers have the further advantage of permitting placement of the fill assembly structure around the entire perimeter of the base of the tower so that operation thereof is relatively insensitive to wind direction. A corollary of this advantage is the fact that recirculation of hot air discharged from a natural draft tower back into the fill assembly at the base of the stack is minimal by virtue of the high elevation at which the moist hot air is discharged into the ambient atmosphere.

Since natural draft stacks must be relatively high to provide adequate chimney effect to assure airflow through the fill assembly of the tower at the most difficult ambient temperature and load conditions which must be met for a particular application, it has been found most expedient to construct the stack of three-dimensional hyperbolic form for structural strength and rigidity. Generally, concrete is used as the medium for fabricating the stacks because of its strength characteristics and ease with which it can be formed into the complex curved form defining a hyperbolic unit. It is well known that natural draft hyperbolic water cooling towers are expensive to construct and can be justified from an economic standpoint only in the case of large thermal loads and available lands from a space and zoning standpoint for construction and operation of a tower of that character. For example, hyperbolic natural draft water cooling towers now being constructed normally are several hundred feet tall and have a correspondingly large base diameter.

Mechanical draft water cooling towers which use motor driven fans for inducing airflow through the fill assembly have achieved widespread commercial use and acceptance on the basis of many important factors, the most important of which is favorable cost to performance properties. Mechanical draft towers may be sized to handle a specific thermal load at a minimum cost and constructed to fit a particular space requirement.

It has been established over the years that mechanical draft crossflow type water cooling towers have many advantages over other types of mechanical draft towers by virtue of the combination of more idealized fluid flow characteristics and low pressure loss to high cooling surface areas. However, for most efficient operation of a mechanical draft tower, whether of the crossflow or counterflow type, recirculation of hot moist air discharged from the tower back into the fill should be minimized. This is especially true as to the lower part of the fill assembly where contact of ambient air with the coldest water produces the final cooling effect. Thus, if the hot moist air discharged from the tower is recirculated back, the tower must be sized larger than would otherwise be required to obtain the design cold water temperature. The problem of hot moist air recirculation is oftentimes aggravated by problems associated with the direction of ambient wind currents blowing against one face of the tower. For example, most presently available mechanical draft, crossflow water cooling towers are of generally rectangular design with air inlets on opposed major faces of the tower and a number of fans projecting upwardly from the top of the tower casing, communicating with the moist air plenum chamber of the tower and operable to pull in air from the ambient atmosphere, move such air through the fill assemblies on opposite sides of the tower in crossflow relationship to water gravitating downwardly in the fill assemblies, and then discharge the hot moist air vertically from the tower through respective velocity recovery cylinders surrounding each of the power operated horizontally disposed fans. In order to minimize recirculation of hot moist air discharged from the tower through the fan cylinders, it is conventional engineering practice to make the cylinders as tall as possible to deliver the hot moist air back into the atmosphere in the farthest spaced relationship from the inlets of the tower as is feasible. However, cost and design considerations dictate against the use of very high fan cylinders. Unless quite high cylinders are used on a rectangular type water cooling tower, recirculation of hot moist air is not necessarily significantly decreased since wind currents blowing against the tower in normal operation tend to produce a wake region characterized by large captive eddies and intense turbulent mixing on the leeward side of the tower attributable to zones of reduced pressure at the edges of the tower casing on such leeward side. These areas of turbulence occur not only along the upright side edges of the tower on the leeward side thereof, but also along the upper horizontal margin of the tower. The zones of reduced pressure on the leeward side of the tower naturally tend to draw efflux fluid from the inclined discharge plume into the wake, thus tending to produce recirculation of hot moist air back through the tower immediately after discharge of the air from the fan cylinders of the cooling tower. As can be appreciated, the tendency for the hot moist air to be drawn back into the captive eddy zone downwind of the tower is increased by virtue of the fact that the ambient wind bends the discharge plume down over the turbulent zone on the leeward side of the tower.

Similarly, extremely tall mechanical draft fan cylinders are costly to fabricate, present engineering problems from the standpoint of mounting the cylinders on the upper part of a mechanical draft tower, are subject to wind induced stress, and frequently must be guyed or otherwise supported by internal spiders or the like to increase the structural rigidity of the cylinders and prevent untoward deflection thereof under high wind loads.

It is therefore the primary object of the present invention to provide a practical and economical solution to many of the problems outlined above by the provision of a circular mechanical draft crossflow water cooling tower which operates with equal efficiency regardless of the direction of the wind and which has minimal hot air recirculation characteristics by virtue of the provision of a large number of fans located in a cluster pattern and mounted for rotation in respective air velocity recovery cylinders which discharge hot moist air from the tower in a concentrated column so that wind currents first engage and most significantly deflect the windward portion of the column but do not tend to bend the leeward portion thereof such that the tendency of the hot air to recirculate back to the air inlet of the tower is substantially reduced or completely eliminated.

A corollary object of the invention is to provide a circular mechanical draft crossflow water cooling tower as described wherein arrangement of the fans and associated cylinders in a cluster pattern inside the perimeter of the annular hot water distribution basin permits utilization of relatively low fan cylinders for economy and minimization of wind deflection problems to thereby provide a tower wherein the low degree of hot air recirculation approaches that of towers having significantly higher fan cylinders or stacks.

A still further important object of the invention is to provide a mechanical draft crossflow water cooling tower which is of circular configuration and has a large number of fans located in a cluster pattern for discharge of a column of hot moist air into the ambient atmosphere above the tower to minimize hot air recirculation regardless of the direction from which the wind is blowing or the velocity thereof. The thermal load which can be handled by this type of tower is thus limited only by factors such as available space or cost limitations arbitrarily imposed by a particular customer, since the tower may be made as large as necessary for a particular job with the number of fans used therein simply being increased proportionately with the increase in tower diameter.

Another important object of the invention is to provide a circular mechanical draft crossflow water cooling tower which lends itself to fabrication from fire resistant materials thus making it possible to construct a tower in many respects equivalent to conventional natural draft crossflow water cooling towers fabricated of fire resistant or retardant components. This may all be accomplished at significant cost savings over an equivalent natural draft water cooling tower having a hyperbolic airflow inducing and discharging stack.

Another important object of the invention is to provide circular mechanical draft crossflow water cooling tower units which have minimum hot air recirculation properties and which lend themselves to use in cooling tower "farms" made up of a number of side-by-side towers, by virtue of the fact that the circular tower is less affected by ambient wind currents than rectangular towers, and it is not necessary to take into account the effect of normally prevailing wind currents in that geographical area which characteristically occur from a particular direction during certain parts of the year.

A still further important object of the invention is to provide a mechanical draft crossflow water cooling tower wherein the circular configuration of the tower contributes to streamline flow of prevailing wind currents therearound so that creation of captive eddies and turbulent areas of reduced pressure on the leeward side of the tower is minimized thus decreasing the tendency of hot moist air discharged from the tower to recirculate back into the air inlet thereof.

An additional important object of the present invention is to provide a circular mechanical draft crossflow water cooling tower having a clustered fan arrangement in which the fans and their attendant velocity increasing cylinders are grouped in concentric, concentrated patterns about the central axis of the tower in order to concentrate the energy of air discharging from the cylinders to the optimum extent possible when practical limitations of space, cost and cooling capacity are considered. In this respect, it is an important aim of the present invention to group the fans and their cylinders in a plurality of concentric hexagonal series which occupy the major portion of surface space within the center of the annular fill assembly of the tower when the aforementioned limitations permit such an arrangement and to group the fans and cylinders in concentric circular series having a central unoccupied zone when such limitations discourage the hexagonal arrangement.

Other objects of the invention and details of construction of the circular mechanical draft water cooling tower of this invention will be explained in detail hereunder or become apparent therefrom.

Four embodiments of circular, mechanical draft crossflow water cooling towers constructed in accordance with the preferred concepts of the present invention are shown in FIGS. 1-4 and are broadly designated by the numerals 10, 12 14, and 16 respectively. Towers 12-16 are virtually identical to one another and function in the same manner, except that the overall dimensions of the towers may vary and each has a different pattern of clustered fan and cylinder structures. Accordingly, only the embodiment of FIG. 4 will be described in complete detail, with the understanding that common structure in the embodiments of FIGS. 1-3 will be denoted by the same numerals given to the corresponding structure in the FIG. 4 embodiment.

An open top, relatively shallow annular cold water collection basin 18 has a circular bottom wall 20 which is joined to an upright interior wall 22 of cylindrical configuration and extending to the top of the tower, while a relatively low cylindrical exterior wall 24 defines the outer margin of wall 20. As is conventional practice in the fabrication of relatively large industrial type water cooling towers, cold water basin 18 is preferably fabricated of reinforced concrete.

Figure 9:
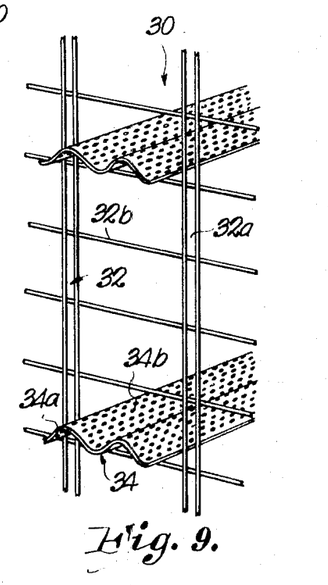
FIG. 9 is an enlarged fragmentary perspective view of one type of fill members which may be conveniently used in the fill assembly of the present invention and also showing preferred grid support structure for such fill members.

Suitable concrete footings are provided for basin 18 enabling the latter to support an annular frame unit 26 of reinforced concrete frame members 28 which extend upwardly from bottom wall 20, present a number of individual fill assembly bays, and comprise an annular support structure extending around the entire circumference of circular tower 16. As is most apparent from FIG. 6, frame unit 26 includes a number of vertical frame members 28a – 28d inclusive extending between horizontal frame members 28e, as well as outermost inclined frame members 28f which project outwardly over wall 24 of basin 18 as the uppermost part of frame unit 26 is approached. Fill assemblies 30 carried by frame unit 26 in the individual bays thereof may comprise any one of a number of different structures for increasing the surface area of hot water to be cooled as such water gravitates downwardly through the fill assemblies 30, but in a preferred embodiment as illustrated in FIG. 9, a series of wire or glass fiber reinforced synthetic resin material such as polyester grids 32 having vertical rod portions 32a interconnected by horizontal, fill member support rods 32b in vertically spaced relationship, are mounted within the fill bays in suspended relationship from respective horizontal frame members of frame unit 26. The fill members 34 supported by horizontal rod portions 32b of vertically disposed horizontally spaced grids 32 preferably comprise corrugated board of multiple wave configuration and having a series of openings 34a extending through the corrugations 34b of each member 34. As is apparent from FIG. 6, in one preferred arrangement of grids 32 and fill members 34, vertical rows of the members are provided with each successive story of fill units being offset inwardly of the tower as the cold water basin 18 is approached to compensate for the tendency of the water gravitating through fill assemblies 30 to be pulled toward the interior plenum chamber 36 of tower 16. The vertical rows of fill members are also offset vertically from the next adjacent vertical row.

Figure 6:
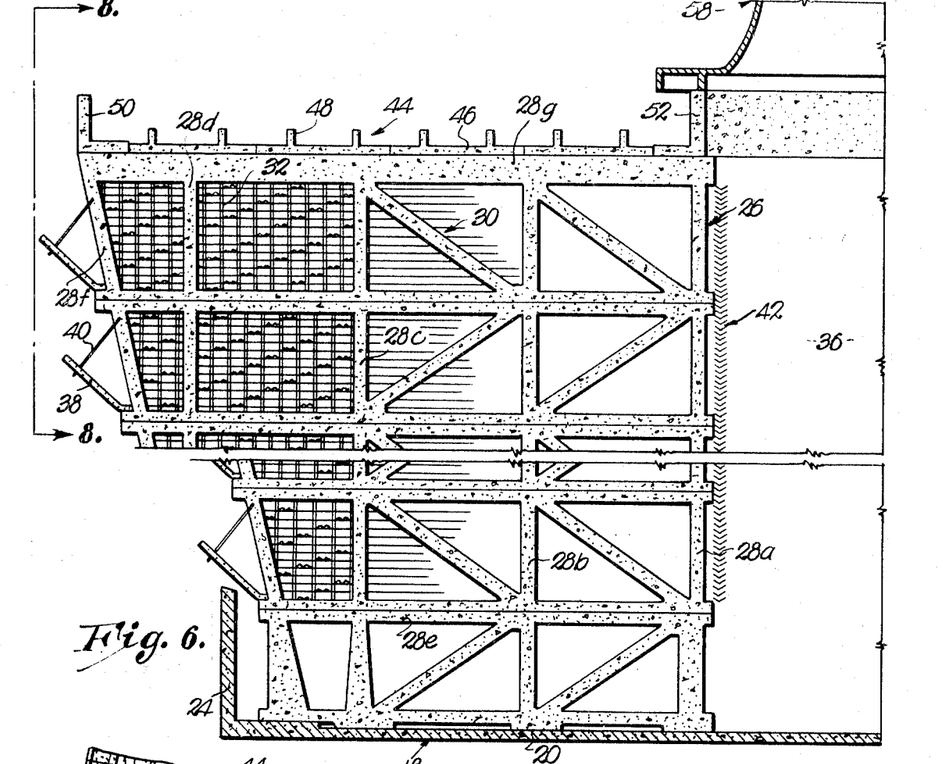
FIG. 6 is an enlarged fragmentary vertical cross-sectional view taken substantially on the line 6—6 of FIG. 4 and looking in the direction of the arrows.
Figure 7:
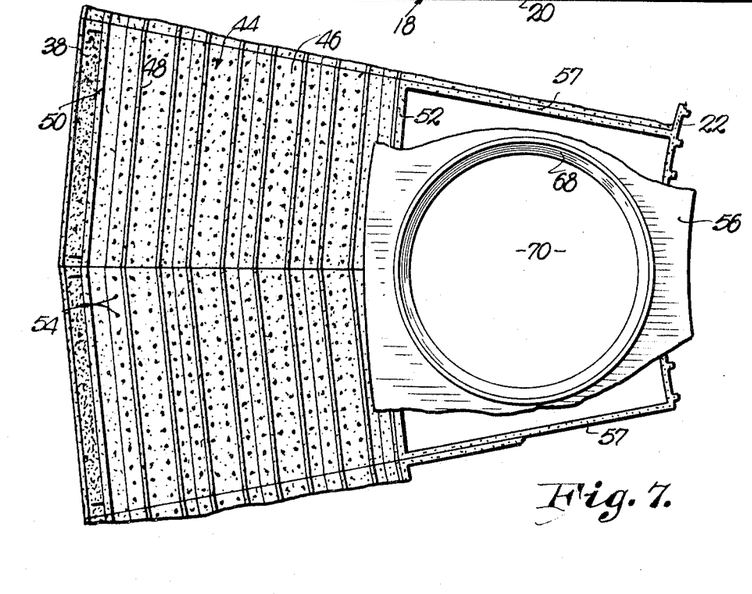
FIG. 7 is an enlarged fragmentary plan view of a portion of the tower construction shown in FIG. 4 with parts thereof being broken away to better illustrate the configuration and construction of components therebelow.
Figure 8:
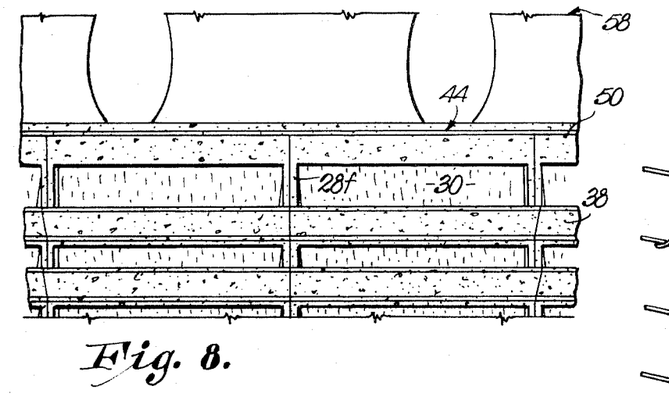
FIG. 8 is a fragmentary side elevational view of the crossflow water cooling tower and showing the outer portion thereof indicated by the broken line 8—8 of FIG. 6.

Elongated, relatively wide inlet louvers 38 of reinforced concrete are provided on the outer face of frame unit 26 in spanning relationship to the individual bays thereof as shown in FIGS. 6, 7 and 8 for containing water in fill assemblies 30 and to prevent significant splash-out of water from the interior of the tower. The rods 40 connected to inclined frame members 28f and corresponding outer end portions of louvers 38 maintain the same in proper inclined disposition of about 45° with respect to the horizontal with the lowermost edges of each louver 38 resting on a frame member 28e as illustrated in FIG. 6. By virtue of the relatively wide nature of louvers 38, the same may be spaced in substantial vertical spaced relationship to minimize pressure drop of air entering the tower for crossflow movement through fill assemblies 30. As illustrated in FIGS. 6 and 7, the inlet louvers 38 overlap vertically and are in inclined stacked relationship such that water gravitating from the lower margin of one louver gravitates onto a louver therebelow while the lowermost inlet louver 38a overlies cold water basin 18 inside of wall 24 so that water flowing from the bottom edge of louver 38a is returned to the collection basin 18.

Conventional eliminator slats 42 are provided in spanning relationship to vertical frame members 28a (FIG. 6) for removing droplets of water entrained in the air leaving fill assemblies 30 and entering the annular plenum chamber 36. The longitudinally inclined eliminator slats 42 are of L-shaped configuration so that the air leaving the fills must change its path of travel before entering chamber 36. As a consequence, droplets of water entrained in the moist air engage the slats 42 and are effectively removed from the airstream. The slats 42 have been shown in upright dispositions, but they also may be inclined to match the angle of water pullback in fill assemblies 30, if desired.

Upper horizontal frame members 28g extending radially of the tower and carried by frame members 28a-28f support an annular hot water distributor broadly designated 44. As is evident from FIGS. 4, 6 and 7, distributor 44 is also preferably constructed of reinforced concrete and has a series of pie-shaped bottom segments 46 located in side-by-side relationship and directly supported by frame members 28g. Upstanding reinforcing sections 48 integral with bottom segments 46 span frame members 28g and are located in generally parallel relationship to define generally circular elements extending around the circumference of distributor 44 and of decreasing diameter as the center of tower 16 is approached. Transversely L-shaped end walls 50 and 52 joined to the outer and inner margins respectively of corresponding bottom segments 46 project upwardly therefrom and define the exterior and interior ends of distributor 44. Thus, bottom segments 46 along with end walls 50 and 52 which are joined one to another cooperate to present an open top, relatively shallow, annular hot water distribution basin 44 with end wall 52 overlying cold water basin 18 while end wall 50 is outboard of exterior basin wall 24 in alignment with the uppermost ends of proximal frame members 28a.

Although not detailed in the drawings, it is to be understood that bottom segments 46 of distributor 44 have a series of orifices 54 therein arranged in a generally rectangular pattern to provide for uniform delivery of water onto fill assemblies 30 therebelow when the annular distributor basin 44 is filled to a predetermined depth with hot water to be cooled. Diffusion and distribution nozzle structire may be provided in each of the orifices 54 if desired for more uniform delivery of water onto the plan area of fill assemblies 30 therebelow.

Figure 4:
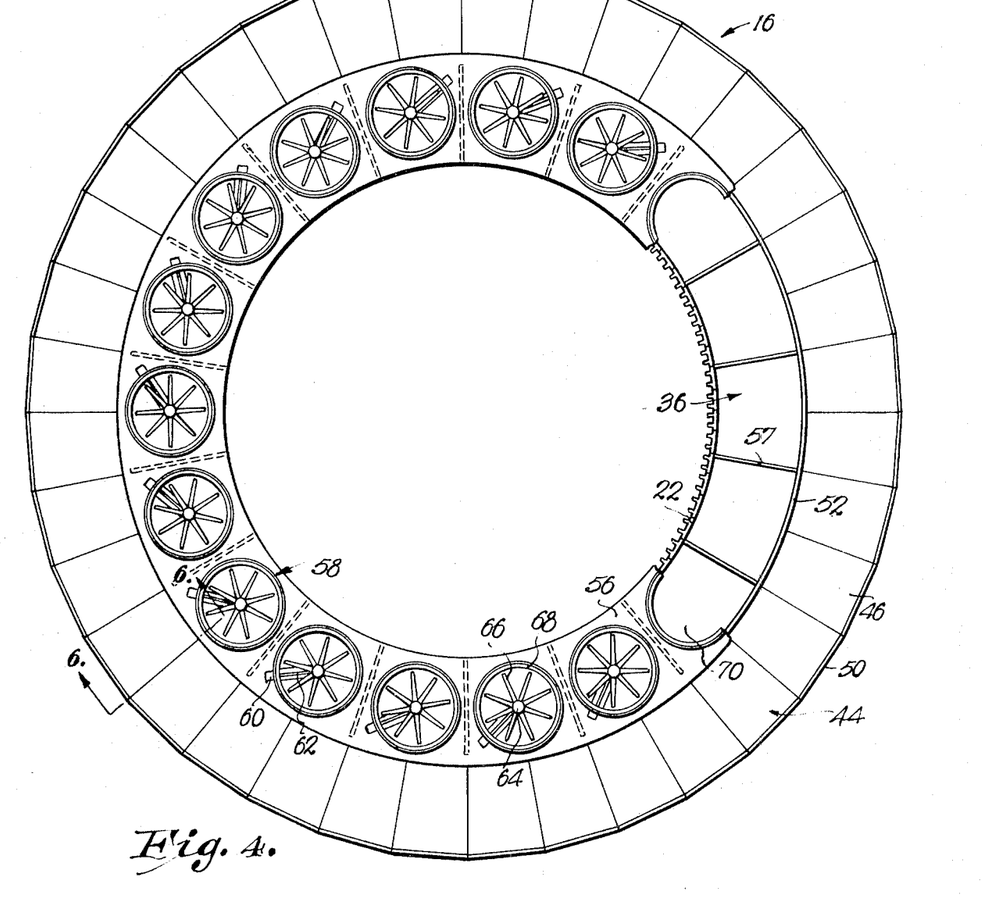
Figure 5:
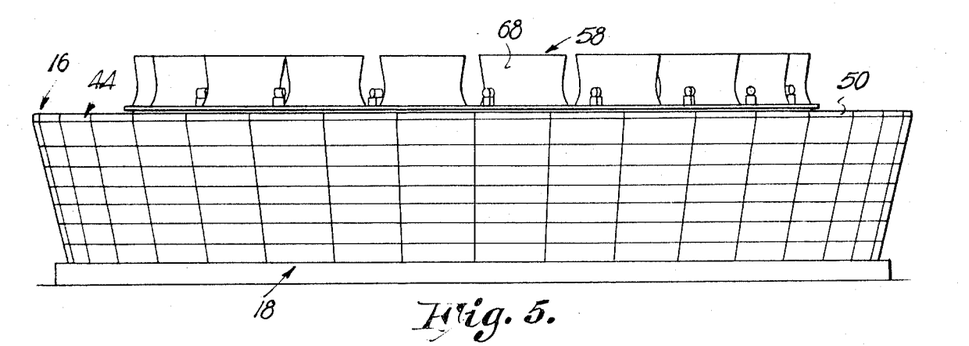
FIG. 5 is a side elevational view of the circular tower schematically illustrated in FIG. 4.

An annular fan and cylinder supporting deck 56 is carried by the upper margins of abutting end walls 52, as well as the upper extremity of inner cylindrical wall 22 in spanning relationship thereto as indicated in FIGS. 4, 6 and 7. In this respect, it is to be again noted that although the components of distributor 44 as well as interior wall 22 and deck 56 may be fabricated of various materials, in the preferred embodiment illustrated in the drawings, reinforced concrete is the most satisfactory material from the standpoint of strength and nonflammability. A series of upright, circularly spaced, radially extending partitions 57 beneath deck 56 lend support to the latter and also serve to divide plenum chamber 36 into a series of side-by-side, individual compartments as partitions 57 join wall 22.

The circular water cooling towers of this invention have most effective use in high thermal load applications wherein many thousands of gallons per minute of water normally must be handled. Accordingly, the towers are generally of relatively large diameters (e.g. 200 − 400 feet for tower 16, 400 − 600 feet for towers 10, 12 and 14) when designed as alternates for natural draft hyperbolic crossflow cooling towers of comparable capacity. A large number of clustered fan units 58 (usually 10 to 18 for tower 16, and up to 60 fans for towers 10, 12 and 14) are thus required to pull sufficient air from the atmosphere in through the air inlet face of fill assemblies 30 to effectively cool the water gravitating therethrough from distributor basin 42 to cold water collection basin 18. In tower 16 the hot water distributor 44 has a typical external diameter of 320 feet, the diameter of cylindrical wall 22 is about 180 feet and in this instance, 18 28 foot fans would be provided to assure adequate inflow of ambient air to the fill assemblies 30 for efficient cooling of the hot water gravitating therethrough.

Each of the fan units 58 includes a drive motor 60 supported by deck 56 and connected through drive shaft 62 to a reduction gear assembly 64 which supports a horizontally rotatable, multi-bladed fan 66. Each fan 66 is rotatable within an upright, open top and bottom velocity-increasing cylinder 68 carried by deck 56 in surrounding relationship to a respective circular opening 70 therein which communicates each unit 58 with a corresponding compartment of chamber 36 therebelow. Cylinders 68 are each preferably of a configuration defining a venturi-passage therethrough for increasing the exhaust efficiency of respective fans 66 by restricting the area in which each fan operates to a passage only slightly larger than the diameter of each fan 66.

Figure 1:
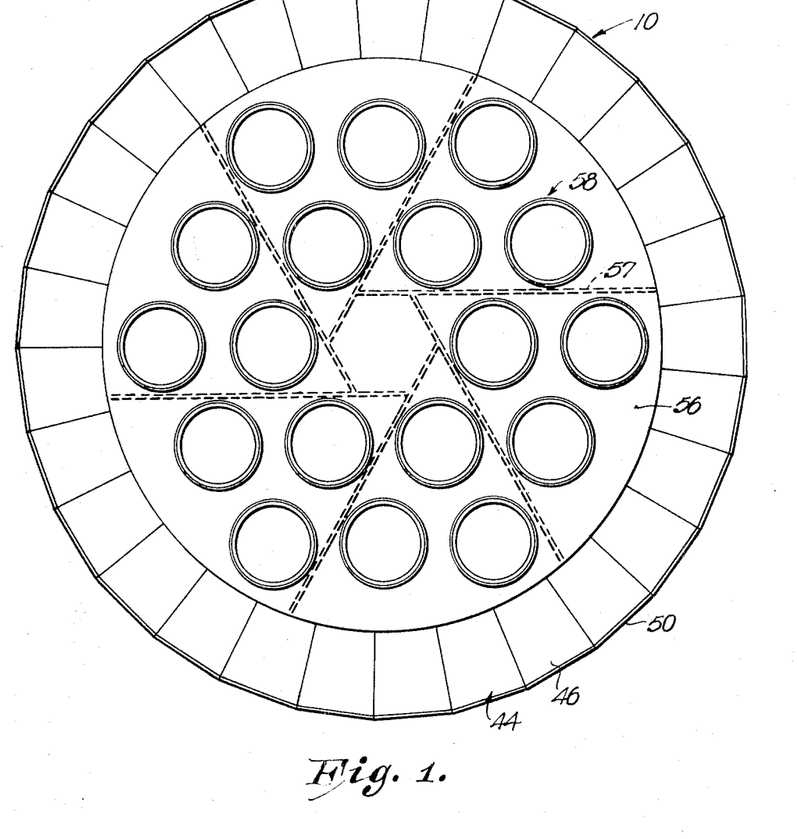
FIG. 1 is an essentially schematic plan view of one embodiment of a circular mechanical draft crossflow water cooling tower constructed in accordance with the preferred concepts of the present invention.

Towers 10 and 16 utilize different cluster formations for the fan units 58. To this end, deck 56 of tower 10 extends substantially further inwardly toward the central upright axis of tower 10 than is true of deck 56 of tower 16 and supports the clustered units 58 in at least two concentric hexagonal series extending around such axis. If additional fan units were required to increase the capacity of tower 10, then extra circumscribing hexagonal series could be added to those already existing to the extent needed. Note in this arrangement that the distance from the central axis to the first hexagonal series is substantially less than the remaining distance to the outside of the outer hexagonal series, thereby assuring that the major part of available surface area within the interior of annular basin 44 is given to producing a discharge column of hot moist air from units 58.

The partitions 57 of tower 10 are not radial, in contrast to those of tower 16. While adjacent partitions 57 do cooperate to define compartments within chamber 36, the need for a separate, cylindrical wall 22 as in tower 16 is obviated by the fact that nonradial partitions 57 intersect one another at spaced intervals about the central axis and in spaced relationship thereto. Thus, it may be seen that the inner marginal ends of partitions 57 cooperate to form an upright hexagonal wall in place of a separate wall 22. In the particular arrangement shown in tower 10, each set of partitions 57 form generally triangular, pie-shaped wedges "containing" three units 58 wherein each partition 57 extends generally tangentially to at least two of the units 58 in the corresponding wedge.

Figure 2:
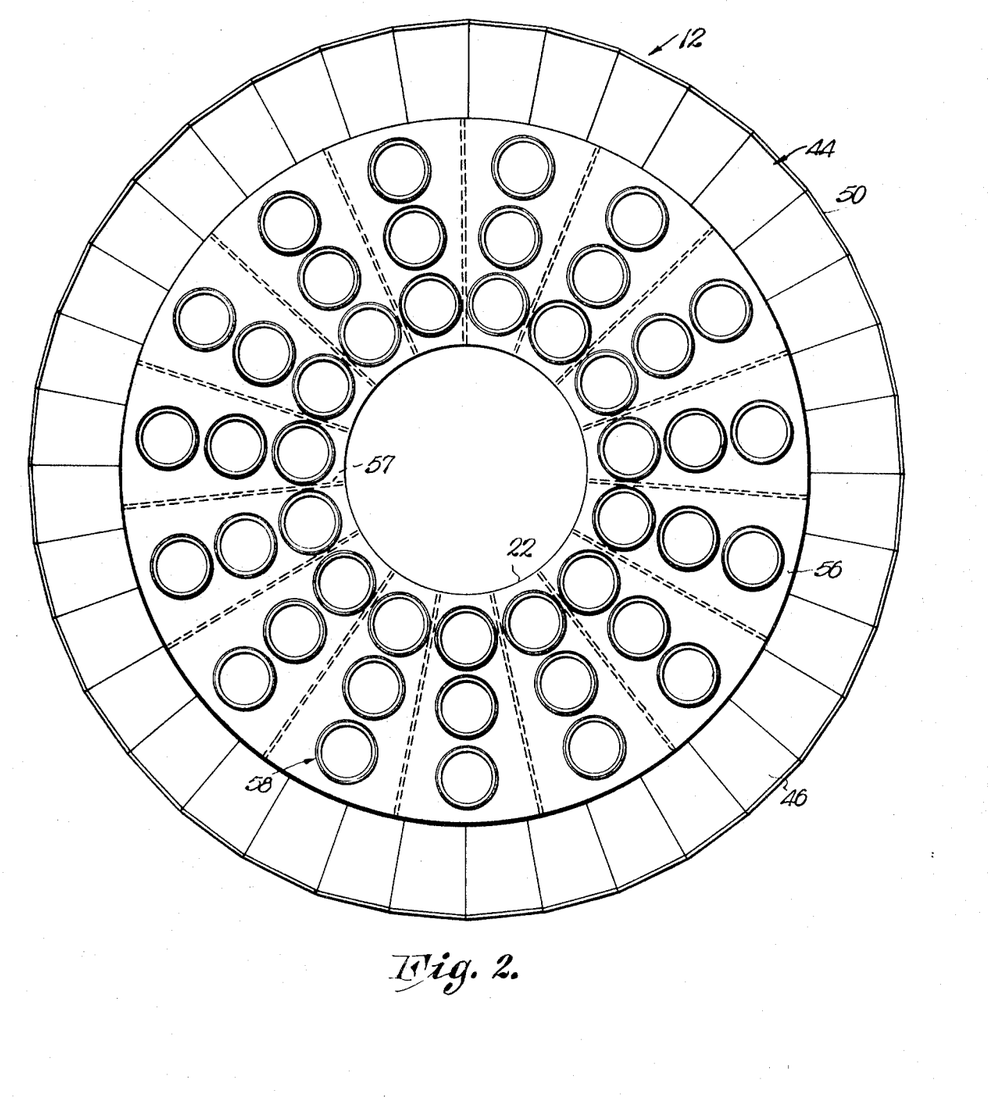
FIGS. 2–4 are essentially schematic plan views of other embodiments of the invention.
Figure 3:
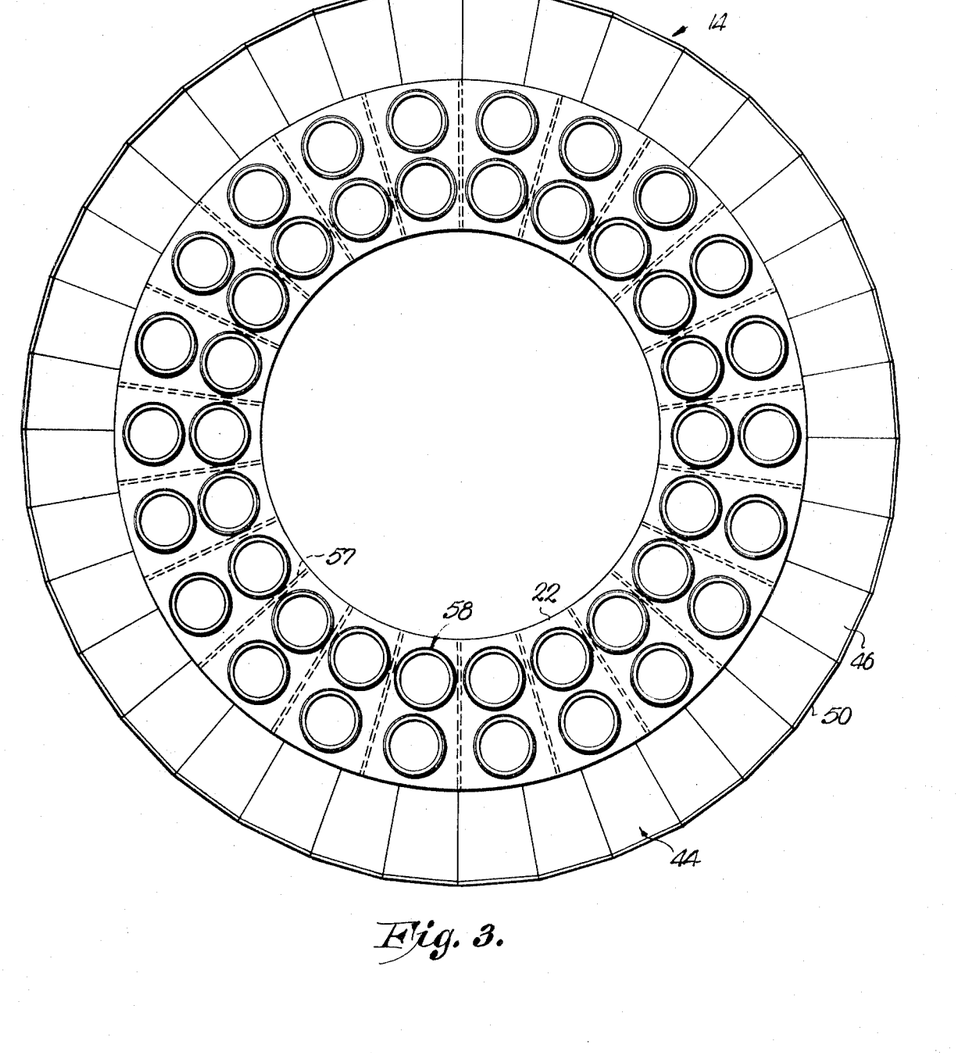

The cluster configuration in tower 16 wherein eighteen units 58 are disposed in a single circular series represents the base arrangement for towers of this diameter wherein a single circle is used. That is, because of cost, space, capacity, and performance considerations, a tower of larger diameter than tower 16 should preferably have a plurality of concentric cluster circles or polygonally-shaped cluster formations instead of further increasing the unoccupied region circumscribed by units 58 by adding additional units 58 to the single circle. In this connection, towers 12 and 14 of FIGS. 2 and 3 show alternate preferred cluster formations wherein the towers are approximately 600 feet in diameter. Towers of this size may require sixty clustered fans as before mentioned to effectively meet the cooling requirements of the facility, and it has been found that three concentric circles of 20 fans each of two concentric circles of 30 fans each may be used to provide both the needed cooling capacity and energy concentration required to produce an essentially stable discharge column. While a hexagonal cluster formation emanating from the center axis out instead of from basin 44 in may be used with towers 12 and 14, the large amount of deck space required for this arrangement with its attendant cost and weight problems must be considered.

In operation, hot water to be cooled is introduced into annular distributor 44 and the level of such water maintained above its reinforcing sections for free flow of water throughout the circular extent of the hot water distribution basin. Individual streams of water gravitate from the bottom of the distributor 44 through corresponding orifices 54 and contact the plan area of fill assemblies 30 underlying the hot water distribution basin 44. Transversely corrugated fill members 34 break up the streams of water to increase the surface area thereof which may be attributed to splash produced by breakup of droplets of water as they impact against a fill member 34 therebelow, film surface cooling as water spreads over the surface of respective fill members 34 and division of the water into smaller streams and droplets as water flows through the openings 34a in the corrugations 34b of fill members 34. Fan units 58 are operated to discharge air vertically therefrom whereby cool ambient air is pulled in through the annular inclined inlet face of fill assemblies 30 and caused to move in crossflow relationship to water gravitating downwardly through assemblies 30 toward cold water collection basin 18. As previously noted, the in-rushing air tends to pull the water back from the annular inlet of the tower and as a result, the fill assemblies 30 are preferably inclined to compensate for such water pullback, thereby avoiding the added expense of providing extra fill at the outer perimeter of the tower which would not be effectively wetted even if it were provided. Droplets of water entrained in the moist air emanating from fill assemblies 30 are removed by the eliminator slats 42 and the moist hot air delivered to plenum chamber 36 is discharged upwardly by the action of fan units 58.

Figure 10:
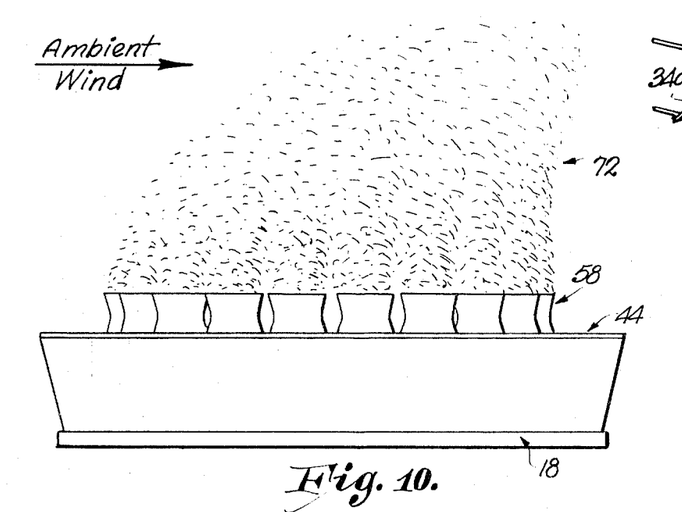
FIG. 10 is a schematic side elevational view representing any of the four embodiments but on a much smaller scale and showing schematically how recirculation of hot moist air back into the air inlet of the tower is minimized by the columnar pattern of air discharged from the clustered, cooperable fans and air velocity recovery cylinders therefor and wherein it can be seen that the leeward portion of the hot air discharge column is permitted to rise substantially vertically by virtue of the protection afforded by the windward portion of the column, thus minimizing hot air recirculation.

As illustrated schematically in FIG. 10, hot moist air streams discharging from any of the herein described towers tend to merge into a single discharge column 72 above clustered fan units 58. This is especially true in tower 10, but is also true in towers 12–16 where the clustered units 58 may be spaced from the central axis to a greater extent than those of tower 10. In either case, because the individual energies of the respective discharge streams are now concentrated into an essentially single discharge column, it may be appreciated that such column is higher rising and more stable than has heretofore been the case.

For example, if it is assumed that the ambient wind direction is from left to right viewing FIG. 10, it is apparent that the wind currents tend to displace the windward portion of column 72, but the leeward portion of column 72 is protected from significant displacement by the windward portion, thus causing the leeward portion of column 72 to rise in almost perpendicular relationship to the ground. Thus, there is no significant problem of recirculation of hot moist air back into the fill assemblies 30 from either side of column 72. Moreover, the high-rising nature of column 72 assures diffusion of the moist discharge air into ambient air remote from the ground, thereby reducing nuisance problems sometimes encountered by neighboring homes and other buildings because of high moisture content in the surrounding air.

One means of increasing the stability of the hot moist air issuing from units 58 is to increase the discharge velocity thereof relative to the velocity of ambient air currents. Thus, the ratio of effluent discharge velocity to ambient air velocity may be denoted as a "K" factor, and the greater the value for "K", the greater the resistance of the discharging effluent to the ambient winds. Hence, the likelihood of effluent recirculation decreases as "K" increases.

This is apparently attributable to the fact that clustering the fan cylinders results in an effective concentration of the total energy of the fan cylinder effluent streams to a sufficiently small area to cause the individual effluent discharges to function in a manner similar to a single stack discharge as is usually obtained with large scale hyperbolic, natural draft towers. The "momentum flux density" of the total discharge effluent column may be calculated by the formula $MFD=(mv/a)$, where $m$ equals the mass of the effluent column, $v$ equals its discharge velocity, and $a$ equals the cross-sectional area of the total effluent column. Buoyancy flux density may likewise be calculated by the formula $BFD=d_{doff}m$, where $d_{diff}$ equals the difference in densities of the effluent and ambient air, $m$ equals the mass of the effluent column, and $a$ equals its cross-sectional area. Thus, it may be seen that an increase in $v$, the effluent discharge velocity, necessarily increases the momentum flux density of the column, assuming other parameters remain constant, which in turn increases the total energy concentration of the column.

For economic reasons it is usually undesirable to simply use additional fan power to increase the discharge velocity of the effluent. By clustering the fan units 58 though, it may be seen that the value of $a$, the total cross-sectional area of the effluent column represented by the series of individual hot, moist air discharges will be reduced from that of a non-clustered arrangement, thereby increasing the momentum flux density of the column and its total energy concentration. In this manner, the resistance of the effluent column to deflection by ambient air currents is significantly increased, resulting in less recirculation of the effluent.

Figure 11:
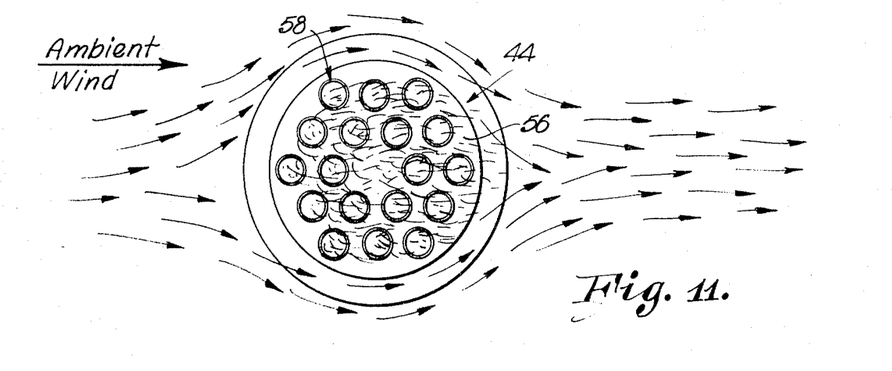
FIG. 11 is a schematic representation of the tower shown in FIG. 1 but on a smaller scale with wind currents flowing past the circular tower from left to right as indicated presenting a generally continuous flow pattern with minimal vortex formation on the leeward side of the tower so that areas of reduced pressure on the leeward side of the tower are avoided thus minimizing hot air recirculation.

It is apparent from the schematic showing in FIG. 11, the aerodynamic configuration of the circular towers results in a greatly reduced separation zone on the leeward side thereof. Tests indicate that only approximately one-fourth or less of the circumference of the tower is exposed to the separation zone, and hence correspondingly less of the flow through the fill finds its origin in the wake fluid. Moreover, for circular towers the concentration of effluent in the wake is somewhat reduced by the improved venting of the wake zone which is continuously diluted by flow around the sides of the tower much more effectively than is the wake of a rectangular tower.

Avoidance of hot moist air recirculated back into the air inlet face of the towers on the leeward side thereof is also assisted by the aerodynamic configuration of the circular tower. As shown schematically in FIG. 11, the ambient air moving from left to right tends to flow around the circular tower in a substantially streamline flow pattern, and therefore there is little tendency for the moist air to be drawn back into the tower because of captive eddy formation induced on the leeward side thereof, or zones of lower air pressure which result from flow of ambient air past rectangular structures as previously explained.

A particularly important benefit obtained from the use of circular mechanical draft crossflow water cooling towers as illustrated and described above is the fact that operation thereof is substantially insensitive to wind direction since elimination of recirculation of hot moist air is avoided regardless of the direction from which the wind is blowing at any particular time.

It has been found that significant recirculation of hot moist air discharged from fan cylinders 68 back into the tower fill may be avoided when the cylinders are of a height as low as three-fourths of the diameter of the fan housed therewithin, and this results in substantial cost savings without adversely affecting the operating efficiency of the tower. It is preferred in all instances that the cylinders 68 be kept at a height less than the diameter of the fan used therein.

Having thus described the invention, what is claimed as new and desired to be secured by Letters Patent is:
1. A crossflow water cooling tower comprising:
   a horizontally disposed, circular hot water distributor provided with distribution means for delivering water from the bottom of the distributor in a generally circular pattern;

an annular fill assembly underlying the distributor in disposition to receive hot water from said distribution means and presenting an upright plenum chamber in the interior space defined thereby, said fill assembly having spaced, generally horizontal fill members for increasing the surface area of water impinging thereon;

a circular cold water collection basin beneath the fill assembly in disposition to catch water gravitating from the fill assembly, the outer annular face of said fill assembly being open to present an air inlet extending from the hot water distributor down to the cold water basin and around the entire perimeter of the fill assembly;

a cluster of upright, tubular open bottom and open top fan cylinders communicating with the plenum chamber and extending above the hot water distributor in the direct path of ambient wind currents; and a fan in each cylinder, rotatable about a respective upright axis and operable to pull air in through said inlet, move such air through the fill assembly in crossflow relationship to the water gravitating therethrough, and then discharge such air vertically through a corresponding cylinder, the cylinders in said cluster being arranged to concentrate the energy of the air discharging from said cylinders a sufficient extent to produce a powerful, high-rising discharge column capable of resisting the tendency of such ambient wind currents to recirculate the discharging air back into said fill assembly.

2. A crossflow water cooling tower as set forth in claim 1, wherein certain of the cylinders in said cluster are disposed closer to the central axis of said annular assembly than are other cylinders in the cluster.

3. A crossflow water cooling tower as set forth in claim 2, wherein said cylinders are clustered in a symmetrical pattern about said axis, the distance from said axis to the nearest cylinder in the pattern being less than the remaining distance to the outer extremity of said pattern.

4. A crossflow water cooling tower as set forth in claim 3, wherein said cylinders are disposed in a plurality of hexagon-shaped, concentric series.

5. A crossflow water cooling tower as set forth in claim 4, wherein is provided a plurality of upright, circularly spaced, nonradially extending partitions in said chamber intersecting at circularly spaced intervals at a distance from said axis to define a plurality of separate compartments in said chamber.

6. A crossflow water cooling tower as set forth in claim 5, wherein is provided a plurality of said cylinders above each of said compartments in direct communication therewith.

7. A crossflow water cooling tower as set forth in claim 4, wherein said cylinders are all of equal diameters.

8. A crossflow water cooling tower as set forth in claim 1, wherein said cylinders are clustered in a single circular series extending about the central axis of said fill assembly.

9. A crossflow water cooling tower as set forth in claim 1, wherein said cylinders are clustered about the central axis of said fill assembly in a pair of concentric, circular series.

10. A crossflow water cooling tower as set forth in claim 9, wherein the distance from said axis to the nearest series is less than the remaining distance to the extremity of the outermost series.

11. A crossflow water cooling tower as set forth in claim 1, wherein said cylinders are clustered about the central axis of said fill assembly in three concentric, circular series.

12. A crossflow water cooling tower as set forth in claim 11, wherein the distance from said axis to the nearest series is less than the remaining distance to the extremity of the outermost series.

13. A crossflow water cooling tower as set forth in claim 1, wherein each of the cylinders is configured to present an upright venturi-shaped passage therethrough.

14. A crossflow water cooling tower as set forth in claim 1, wherein said fill assembly is of larger outside diameter adjacent the upper part thereof than at the lower portion of the same.

15. A crossflow water cooling tower as set forth in claim 1, wherein said outer annular face of the fill assembly is of generally frustoconical configuration with the outer diameter thereof decreasing as the cold water basin is approached, and the outermost margin of the cold water basin is disposed in relatively close proximity to the outer margin of the fill assembly at the bottom thereof.

16. A crossflow water cooling tower as set forth in claim 15, wherein is provided a series of vertically spaced inlet louvers across said outer annular face of the fill assembly, said louvers presenting stacked annular ring segments of decreasing diameter as the cold water basin is approached, the stack of louvers being inclined in generally conforming relationship to the inclined, outer face of the fill assembly.

17. A crossflow water cooling tower as set forth in claim 1, wherein said water distributor comprises an open top annular basin having a series of water distributor orifices in the bottom wall thereof.

18. A crossflow water cooling tower as set forth in claim 1, wherein said water distributor is of annular configuration.

19. A water coling water as set forth in claim 18, wherein is provided an upright annular wall extending upwardly from the cold water basin in spaced relationship from the inner face of the fill assembly and cooperable therewith to present an annular plenum chamber, said cylinders being located outboard of the wall between the latter and said water distributor.

20. A water cooling tower as set forth in claim 19, wherein is provided an annular cylinder support ring inboard of the hot water distributor in direct overlying relationship to the plenum chamber and provided with an opening therein for each of the cylinders in coaxial relationship thereto, and wherein is also provided frame means carrying the fill members of the fill assembly and supporting the hot water distributor thereabove, said cylinder support ring spanning the distance between said frame means and the wall and carried thereby.

21. A crossflow water cooling tower as set forth in claim 18, wherein is provided an annular cylinder support ring inboard of the hot water distributor in direct overlying relationship to the plenum chamber and provided with an opening therein for each of the cylinders in coaxial relationship thereto.

22. A crossflow water cooling tower as set forth in claim 1, wherein at least ten cylinders and associated fans are provided above the plenum chamber.

23. A crossflow water cooling tower as set forth in claim 1, wherein the distance between each cylinder is substantially less than the minimum diameter of each cylinder.

24. A crossflow water cooling tower as set forth in claim 1, wherein the cylinders are all of the same vertical height.

25. A crossflow water cooling tower as set forth in claim 1, wherein the cylinders are all of the same diameter and vertical height.

26. A crossflow water cooling tower as set forth in claim 1, wherein is provided cementitious supports for said fill members and the hot water distributor and said cold water basin are of cementitious material.

27. A water cooling tower as set forth in claim 1, wherein each of said fill members comprises a transversely corrugated element and located in disposition with the widest transverse dimension thereof extending horizontally.

28. A water cooling tower as set forth in claim 27, wherein each of said fill members has a series of openings therethrough.

29. A water cooling tower as set forth in claim 1, wherein the height of each of said cylinders is less than the diameter of the fan therewithin.

30. A water cooling tower as set forth in claim 1, wherein the height of each of said cylinders is approximately three-fourths of the diameter of the fan therewithin.

* * * * *

PO-1050
(5/69)

UNITED STATES PATENT OFFICE
CERTIFICATE OF CORRECTION

Patent No. 3,743,257    Dated July 3, 1973

Inventor(s) HOMER E. FORDYCE

It is certified that error appears in the above-identified patent and that said Letters Patent are hereby corrected as shown below:

After §[76], insert an assignment section to read --Assignee: THE MARLEY COMPANY, Mission, Kansas --.

Signed and sealed this 26th day of November 1974.

(SEAL)
Attest:

McCOY M. GIBSON JR.
Attesting Officer

C. MARSHALL DANN
Commissioner of Patents